(12) United States Patent
Pike et al.

(10) Patent No.: US 10,242,043 B2
(45) Date of Patent: *Mar. 26, 2019

(54) SOFTWARE SECURITY VIA CONTROL FLOW INTEGRITY CHECKING

(71) Applicant: Galois, Inc., Portland, OR (US)

(72) Inventors: Lee Pike, Portland, OR (US); Patrick Christopher Hickey, Portland, OR (US); Aaron Tomb, Portland, OR (US); Eric Mertens, Portland, OR (US)

(73) Assignee: Galois, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,577

(22) Filed: Dec. 14, 2017

(65) Prior Publication Data

US 2018/0101565 A1 Apr. 12, 2018

Related U.S. Application Data

(62) Division of application No. 14/060,506, filed on Oct. 22, 2013, now Pat. No. 9,846,717.

(60) Provisional application No. 61/717,582, filed on Oct. 23, 2012.

(51) Int. Cl.
| | | |
|---|---|---|
| *G06F 11/36* | (2006.01) | |
| *G06F 17/30* | (2006.01) | |
| *G06F 21/52* | (2013.01) | |
| *G06F 21/56* | (2013.01) | |

(52) U.S. Cl.
CPC .... *G06F 17/30371* (2013.01); *G06F 11/3604* (2013.01); *G06F 21/52* (2013.01); *G06F 21/566* (2013.01)

(58) Field of Classification Search
None
See application file for complete search history.

(56) References Cited

U.S. PATENT DOCUMENTS

| | | | | |
|---|---|---|---|---|
| 6,233,250 | B1 * | 5/2001 | Liu | H04L 12/5601 370/235 |
| 6,856,953 | B1 * | 2/2005 | Randmaa | G06F 11/3672 704/200 |
| 7,577,992 | B2 | 8/2009 | Abadi et al. | |
| 7,971,255 | B1 * | 6/2011 | Kc | G06F 21/566 713/164 |

(Continued)

OTHER PUBLICATIONS

Abadi et al., "Control-Flow Integrity," ACM Conference on Computer and Communication Security (CCS), Nov. 2005, 14 pages.

(Continued)

*Primary Examiner* — Lynn D Feild
*Assistant Examiner* — Richard A McCoy
(74) *Attorney, Agent, or Firm* — Klarquist Sparkman, LLP

(57) ABSTRACT

Various technologies related to control flow integrity checking are described herein and can be used to greatly improve software security. During static analysis, a canonical control flow graph can be built. Execution of a program can be interrupted at runtime, and the call stack can be observed to verify control flow integrity of the program using the canonical control flow graph. Attacks using stack tampering can be avoided, regardless of how the stack tampering is achieved. Non-invasive techniques can be used, making the technologies applicable in situations where source code is not available. Real-time operating system protection can be supported.

18 Claims, 17 Drawing Sheets

(56) References Cited

U.S. PATENT DOCUMENTS

| | | | |
|---|---|---|---|
| 8,117,660 B2* | 2/2012 | Pan | G06F 21/54 717/131 |
| 8,312,434 B2* | 11/2012 | Bates | G06F 11/3664 717/124 |
| 9,223,554 B1* | 12/2015 | Lawson | G06F 8/53 |
| 9,846,717 B2 | 12/2017 | Pike et al. | |
| 2003/0005415 A1* | 1/2003 | Bates | G06F 11/362 717/129 |
| 2004/0205409 A1* | 10/2004 | Wu | G06F 8/443 714/38.13 |
| 2005/0015766 A1* | 1/2005 | Nash | G06F 9/4881 718/102 |
| 2005/0223364 A1* | 10/2005 | Peri | G06F 11/3636 717/128 |
| 2005/0278728 A1* | 12/2005 | Klementiev | G06F 9/45512 719/328 |
| 2007/0136728 A1* | 6/2007 | Saito | G06F 9/468 718/100 |
| 2007/0180524 A1* | 8/2007 | Choi | G06F 12/1441 726/23 |
| 2008/0168460 A1* | 7/2008 | Lee | G06F 9/5016 718/104 |
| 2008/0244152 A1* | 10/2008 | Chai | G06F 12/0646 711/3 |
| 2008/0256519 A1* | 10/2008 | Shen | G06F 9/4486 717/128 |
| 2009/0064118 A1* | 3/2009 | Raber | G06F 8/53 717/159 |
| 2009/0187748 A1* | 7/2009 | Krig | G06F 9/3004 712/227 |
| 2009/0217020 A1* | 8/2009 | Yourst | G06F 9/383 712/245 |
| 2009/0222803 A1* | 9/2009 | Bratanov | G06F 9/4486 717/155 |
| 2009/0328231 A1* | 12/2009 | Gonzalvo | G06F 9/45504 726/26 |
| 2010/0199035 A1* | 8/2010 | Matsuo | G06F 3/0625 711/111 |
| 2011/0057934 A1* | 3/2011 | Goldhor | G06F 17/3002 345/475 |
| 2012/0096447 A1* | 4/2012 | Inglis | G06F 8/4443 717/148 |
| 2015/0220453 A1* | 8/2015 | Heisswolf | G06F 12/1441 726/27 |
| 2016/0300060 A1 | 10/2016 | Pike et al. | |

OTHER PUBLICATIONS

Abadi et al., "Control-Flow Integrity: Principles, Implementations, and Applications," ACM Transactions of Information and System Security, vol. 13, No. 1, Article 4, Oct. 2009, 40 pages.

Diatchki et al., "Practical Considerations in Control-Flow Integrity Monitoring," *The Second International Workshop on Security Testing (SECTEST)* 2011, Mar. 2011, 8 pages.

Pike et al., "TrackOS: a Security-Aware RTOS," AFRL S5, Symposium hosted by Air Force Research Laboratory, Jun. 2012, 27 pages.

Seshardri et al., "SWATT: SoftWare-based ATTEstation for Embedded Device," IEEE Symposium on Security and Privacy, pp. 272-282, May 2004, 11 pages.

Seshardi et al., "Scuba: Secure code update by attestation in sensor networks," in ACM Workshop on Wireless Security (WiSe 2006), Sep. 2006, 10 pages.

* cited by examiner

```
PROGRAM 600
function B_Task {
 ...
 BFunctionv();
 ...
} function BFunction {
 ...
 foo1();
 ...
 vPortYield();
 vPortYield();
 ...
 foo2();
 ...
 vPortYield();
 ...
} function foo1 {
 ...
 foo2();
 ...
} function foo2 {
 ...
 vPortYield();
 ...
 foo5();
 ...
} function foo5 {
 ...
 vPortYield();
 ...
}
```

FIG. 6

PROGRAM 700

B_Task: ...
B_Task+2: call BFunction
B_Task+4: ...

BFunction: ...
  ...
BFunction+8: call foo1
  ...
BFunction+18: call vPortYield
BFunction+20: call vPortYield
  ...
BFunction+72: call foo2
  ...
BFunction+82: call vPortYield
  ...

foo1: ...
  ...
foo1+50: call foo2
  ...

foo2: ...
  ...
foo2+80: call vPortYield
  ...
foo2+84: foo5
  ...

foo5: ...
  ...
foo5+48: call vPortYield
  ...

vPortYield: ...

FIG. 7

```
Result: Success or Failure
if Is top of stack inside tick vector? then
    The bottom of the tick vector frame is a known number of bytes below the top of stack.
    At the tick vector frame bottom is the preemption address.
    Find Frame From Preemption Address.
else
    if Is the top of stack inside a cooperative yield call? then
        The caller frame of the cooperative yield is a known number of bytes below the top of
        stack. Use the caller frame as the found frame.
    else
        if Did a non-kernel ISR cause a cooperative yield? then
            Look up the ISR cooperative yield site in a special table.
            The bottom of the ISR's frame is a known number of bytes below the top of stack.
            At the ISR frame bottom is the preemption address.
            Find Frame From Preemption Address.
        else
            if Has the RTOS not yet started the task? then
                Exit with Success.
            else
                Exit with Failure.
            end
        end
    end
end
if Successfully found frame then
    while Neither Success nor Failure do
        Call Check Stack From Frame with found frame.
        if call returns failure then
            Exit with Failure
        else
            if Stack frame matches the task entry point then
                Exit with Success.
            else
                Continue loop with return value as new found frame.
            end
        end
    end
else
end
```

ROUTINE A: STACK CHECKING

```
Result: Caller frame of Preempted Block (or Failure)
The preemption address is given.
The preemption address should exist somewhere in a known block.
The Block Table contains each block's start and end address.
Search for block containing the preempted address in the Block Table.
if Containing block found then
    The block start address is known.
    The Callee Map is a map which specifies a list of valid call sites of a block, keyed by
    block start address.
    Look up the list of valid call sites for this block.
    The Stack Frame Size Table is a map which specifies the maximum data bytes
    pushed to the stack inside a block, keyed by block start address.
    Look up the block start address in the Stack Frame Size Table.
    This is the maximum stack frame depth.
    for Stack frame offsets between zero and the maximum stack frame depth do
        Consider the value at the current stack frame offset as a potential caller address.
        Search the list of valid call sites for this address.
        if Found a valid call site then
            | Exit with the stack frame at the current offset.
        else
            | Continue loop.
        end
    end
else
    | Exit with Failure.
end
```

ROUTINE B: FRAME FROM PREEMPTION ADDRESS

1500

FIG. 15

```
Result: Caller Stack Frame (or Failure)
The current frame return address is given.
The Valid Return Map is a map which specifies a list of pairs of caller's return address
and stack sizes, keyed by the current frame return address (the address pushed on top of the
current frame).
Look up the current frame return address in the Valid Return Map.
if Current frame found in Valid Return Map then
    The list of pairs of caller return address and stack sizes is known. for Each pair of caller
    return address and caller stack size do
        Consider the value on the stack at an offset of the caller stack size.
        If Value on stack matches caller return address then
         |  Exit with the stack at an offset of the caller stack size.
        else
         |  Continue loop.
        end
    end
else
 |  Exit with Failure
end
```

ROUTINE C: CHECK STACK FROM FRAME

SOFTWARE SECURITY VIA CONTROL FLOW INTEGRITY CHECKING

CROSS REFERENCE TO RELATED APPLICATIONS

This is a divisional of U.S. patent application Ser. No. 14/060,506, filed on Oct. 22, 2013, and claims the benefit of U.S. Provisional Patent Application No. 61/717,582, filed Oct. 23, 2012, both of which are hereby incorporated herein by reference in their entirety.

ACKNOWLEDGMENT OF GOVERNMENT SUPPORT

This invention was made with government support under Contract No. FA8650-11-C-1003 awarded by the Air Force Research Laboratory. The government has certain rights in the invention.

BACKGROUND

As computing systems become more ubiquitous and connected, software security is emerging as a top priority. Although security experts design systems with features to improve security, attackers work tirelessly to circumvent such security features. Unfortunately, for almost any new security feature, an exploit eventually surfaces to target its weaknesses.

Although various approaches have been taken to address the situation, there is still a need to provide better techniques for securing software.

SUMMARY

A variety of techniques can be used for securing software via control flow integrity checking technologies. A control flow graph can be constructed for a program, and execution of the program can be monitored to be sure that the program respects the control flow graph.

Technologies described herein can be implemented without having to modify or instrument the monitored program, making the technologies especially beneficial in real-time operating systems.

Considerable overall improvements to software security can be realized.

As described herein, a variety of other features and advantages can be incorporated into the technologies as desired.

The foregoing and other features and advantages will become more apparent from the following detailed description of disclosed embodiments, which proceeds with reference to the accompanying drawings.

BRIEF DESCRIPTION OF THE FIGURES

FIG. 6 is a source code listing of an exemplary program.

FIG. 7 is a pseudo-disassembly from a linked binary program originating from that shown in FIG. 6.

FIGS. 14, 15, and 16 are pseudo code listings for a stack checking technique.

DETAILED DESCRIPTION

EXAMPLE 1

Exemplary Overview

The technologies described herein can be used for a variety of software security scenarios. Adoption of the technologies can provide a more robust technique for preventing software attacks and can serve as an additional security layer that can detect exploitation of vulnerabilities in the target system, such as those related to stack manipulation attacks.

The technologies can be helpful to those wishing to secure systems even when all vulnerabilities of a particular system are not known. Beneficiaries include those wishing to provide a more secure environment in which software can execute. Developers can also greatly benefit from the technologies because their programs enjoy the protection of an extra layer of security when executed. Finally, end users and protected systems similarly benefit because various software attacks can be avoided.

EXAMPLE 2

Exemplary System Employing a Combination of the Technologies

Figure 1:
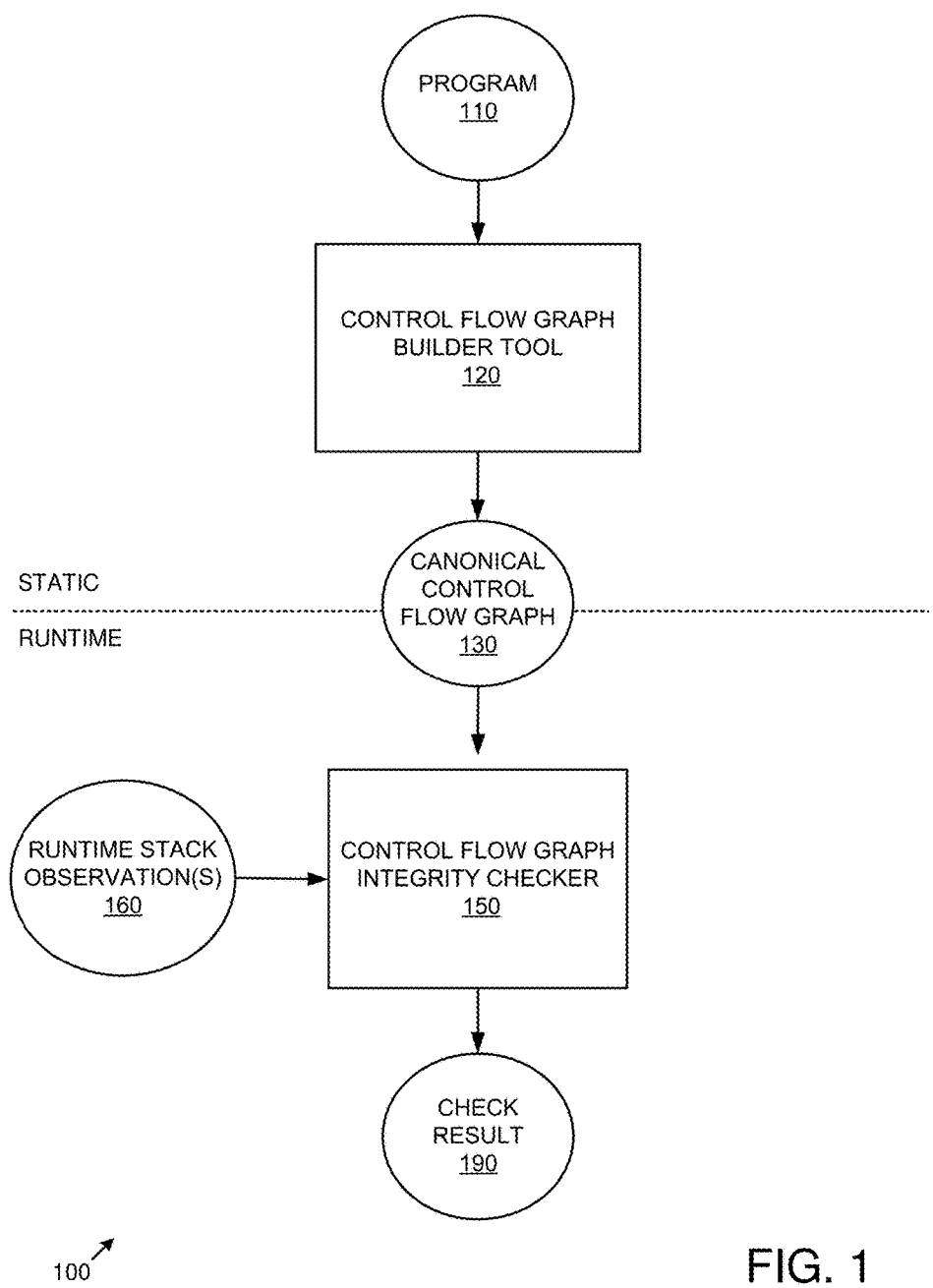
FIG. 1 is a block diagram of an exemplary system implementing the control flow integrity checking technologies described herein.

FIG. 1 is a block diagram of an exemplary system 100 implementing the control flow integrity checking technologies described herein. In the example, one or more computers in a computing environment implement static analysis and runtime execution in a composite system 100. In practice, the static and runtime aspects of the invention can be carried out at different times, by different entities, and on different systems.

The control flow graph builder tool 120 accepts a program 110 as input and generates a canonical control flow graph 130 as output. The tool 120 can achieve its result via static analysis (e.g., without executing the program 110). In practice, a single canonical control flow graph 130 can be created by one system and used by a plurality of recipient systems that execute the program 110.

The control flow graph integrity checker 150 executes at runtime and accepts the canonical control flow graph 130 along with one or more runtime stack observations 160 as input and outputs a check result 190 (e.g., indicating whether the stack conforms to the canonical control flow graph, which indicates control flow integrity according to the canonical control flow graph 130). If control flow integrity is violated (e.g., the check fails), the checker 150 can so indicate.

In practice, the systems shown herein, such as system 100 can be more complicated, with additional functionality, more complex inputs, additional outputs, and the like.

In any of the examples herein, the inputs, outputs, and tools can be stored in one or more computer-readable storage media or computer-readable storage devices.

EXAMPLE 3

Figure 2:
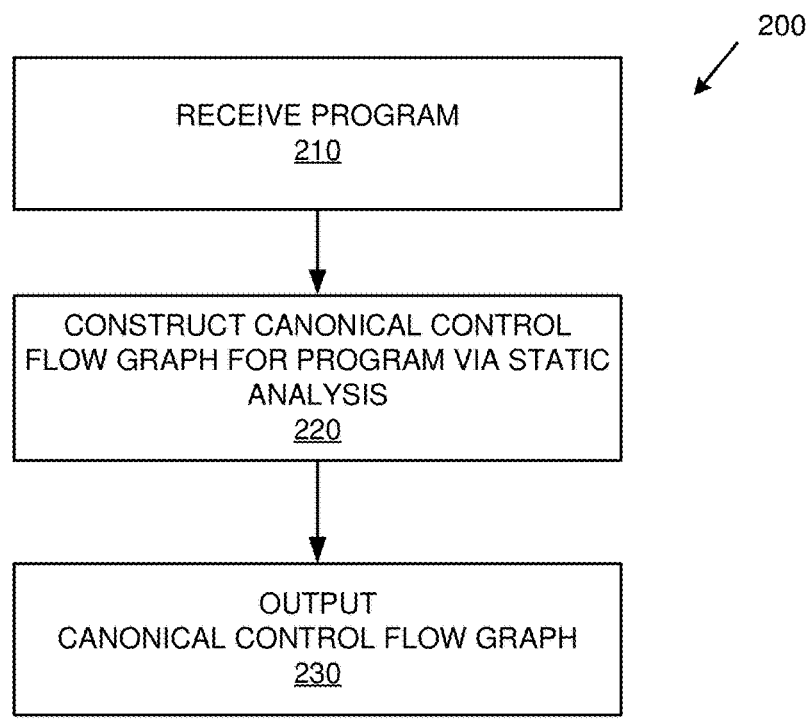
FIG. 2 is a flowchart of an exemplary method of implementing the control flow integrity checking technologies described herein via building a control flow graph.

Exemplary Method of Applying a Combination of the Technologies: Building the Control Flow Graph FIG. 2 is a flowchart of an exemplary method 200 of implementing the control flow integrity checking technologies described herein via building a control flow graph and can be implemented, for example, in a system such as that shown in FIG. 1. The technologies described herein can be generic to the specifics of operating systems or hardware and can be applied in any variety of environments to take advantage of the described features.

The method 200 is typically employed before a particular program to be secured is loaded onto a target computing system. As described herein, the resulting control flow graph can then be provided to the target computing system, which can use the graph to verify control flow integrity of the program at runtime.

At 210, the program to be secured is received.

At 220, a canonical control flow graph for the program is constructed via static analysis. For example, ordinarily possible execution paths (e.g., every path) can be followed (e.g. without respect to data values and whether or not conditional statements are fulfilled) and the results recorded in a canonical control flow graph.

Any of a variety of techniques can be used for static analysis to generate the control flow graph. As described herein, it can be an under-approximation of actual control flow (e.g., not all possible information need be contained in the graph).

At 230, the canonical control flow graph is output (e.g., for use in control flow integrity checking as described herein).

The method 200 and any of the methods described herein can be performed by computer-executable instructions stored in one or more computer-readable media (e.g., storage or other tangible media) or stored in one or more computer-readable storage devices.

EXAMPLE 4

Figure 3:
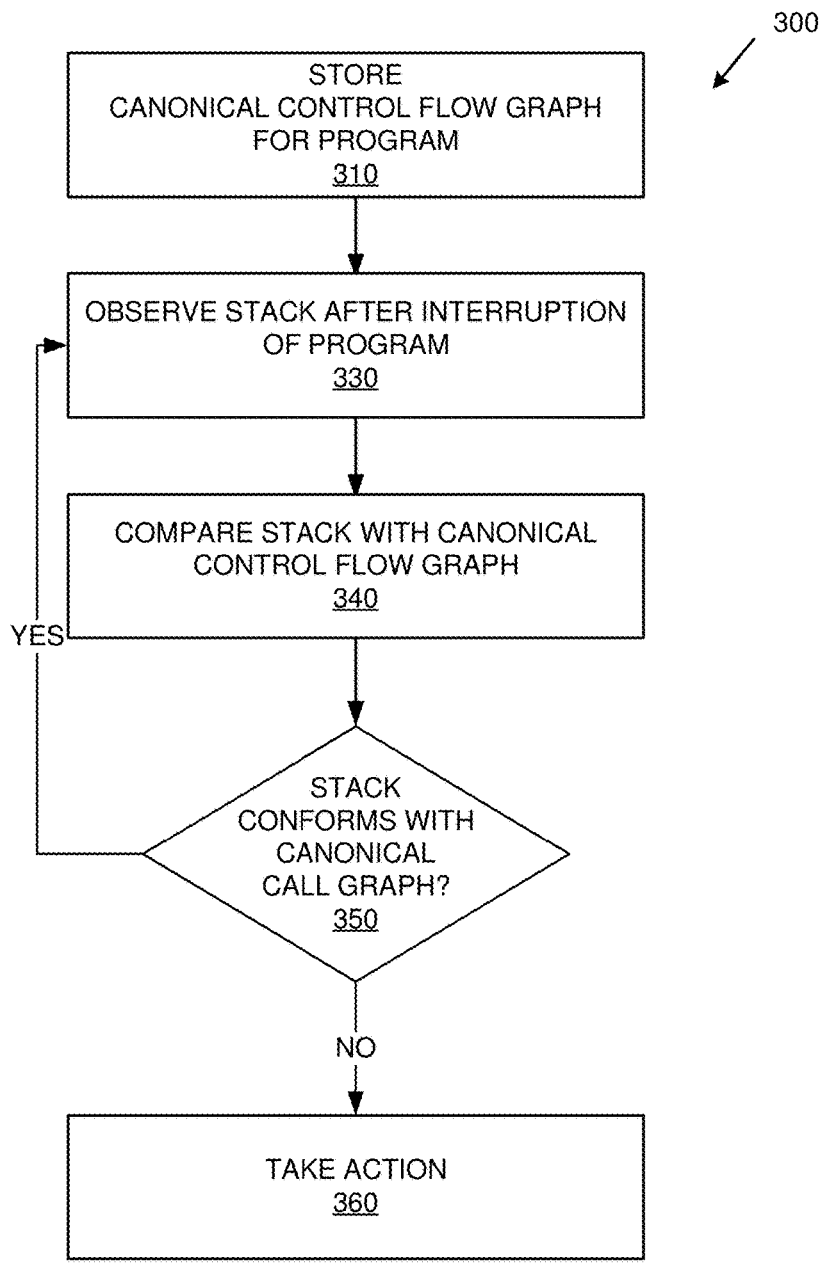
FIG. 3 is a flowchart of an exemplary method of implementing the control flow integrity checking technologies described herein via checking control flow graph integrity.

Exemplary Method of Applying a Combination of the Technologies: Checking the Stack Against the Control Flow Graph FIG. 3 is a flowchart of an exemplary method 300 of implementing the control flow integrity checking technologies described herein via checking control flow graph integrity and can be implemented, for example, in a system such as that shown in FIG. 1. The method 300 is typically implemented during execution (runtime) of the program being checked.

At 310, a canonical control flow graph (e.g., such as that built as described herein) is stored for a program. As described herein, the control flow graph can indicate the possible ordinary execution paths for a program.

At 330, the stack is observed after interruption of execution of the program. For example, the program can be periodically interrupted during execution (e.g., by an operating system) to perform multiple repeated observations. The program need not be instrumented to achieve interruption. Program interruption can be achieved in hardware (e.g., using interrupts for a timer or an IO event) or software (e.g., the operating system). The exact hardware and software mechanisms can vary by platform and implementation.

Observation can include determining contents of the stack (e.g., contents of one or more stack frames). Due to interruptibility of the integrity check process itself, the entire stack need not be observed.

At 340, control flow integrity is verified. For example, contents of the stack can be compared with the canonical control flow graph. Stack cruft can be removed before the comparison as described herein. As described herein, checking can navigate through stack frames while navigating through the call flow graph in parallel to determine whether the two match. The comparing can include determining whether the stack contents indicate an execution path not appearing in the ordinary execution paths shown in the canonical control flow graph.

At 350, it is determined whether the stack conforms to the canonical call graph (e.g., whether the stack contents indicate only execution paths (e.g., via return addresses) appearing in the possible ordinary execution paths shown in the canonical control flow graph). If it does, execution of the program can continue (e.g., until program termination, if any). Otherwise, the stack contents indicate an execution path not appearing in the possible ordinary execution paths, and at 360 some action is taken (e.g., to avoid further execution of the program).

EXAMPLE 5

Exemplary Canonical Control Flow Graph

In any of the examples herein, a canonical control flow graph can represent the possible ordinary execution paths for a program. Execution paths can be indicated via nodes representing address ranges and edges indicating connections (e.g., calls) between such address ranges. Such execution paths need not explicitly indicate every address or instruction (e.g., a range of addresses can be indicated). Because the control flow graph indicates calls from one portion of the program to another, it is sometimes called a "call graph."

Because attacks can send programs on execution paths that are not ordinarily possible, possible ordinary execution paths are limited to those that would result in the absence of an attack (e.g., a call stack attack that modifies contents of the stack below the current frame).

The canonical control flow graph can be annotated to indicate a maximum number of data bytes (e.g., memory units) pushed on the stack by instructions within an indicated address range (e.g., represented by a node in the graph). For example, edges representing calls can be so annotated (e.g., to indicate the number of data bytes on the stack at the time of the call).

Other information can be represented in the canonical control flow graph as described herein. Some representations can be arranged to facilitate checking performance during runtime.

In any of the examples herein, control flow integrity of a program can be determined by observing whether the program respects its statically-computed canonical control flow graph.

EXAMPLE 6

Exemplary Call Stack

In any of the examples herein, the call stack is sometimes simply called the "stack." Such a stack is sometimes called an execution stack, control stack, run-time stack, or machine stack. The stack maintains information (e.g., return addresses) for active subroutine calls while a program is executing. Typical operations performed on a call stack include push, pop, call, and return instructions. Some platforms and compilers include instructions for direct modification of the stack pointer, direct memory access to values on the stack, and the like. By observing return addresses on the stack, one can infer past callers in sequential order.

The processor uses a region of memory as a stack. The stack is a first-in, last-out store; a byte of data can (e.g., should) only be written onto the top of the stack, or read from the top position during ordinary execution. The top of the stack moves up by one memory unit (e.g., byte) after a write, and down one memory unit after a read. Such reads and writes can be performed for arbitrary data using the instructions pop and push, respectively.

EXAMPLE 7

Exemplary Data Bytes Pushed on Stack

In any of the examples herein, when the control flow graph is built during static analysis, the number of bytes (e.g., memory units) on the stack when a call takes place can be tracked. Such bytes are typically parameters passed to the called routine and are sometimes called "ordinary data" or "non-return-address" bytes.

The number of bytes tracked can subsequently be used to find the next stack frame during runtime. The number of bytes on the stack can be determined by tracking pushes, pops, or other stack manipulations, with the net number of bytes sometimes called "number of bytes pushed onto the stack." Such a number can be represented as a maximum number of bytes pushed onto the stack (e.g., by a range of instructions).

The maximum possible number of data bytes pushed inside a call can be considered as a simplification (e.g., rather than a discrete set). For example, different non-call control flow paths (e.g., jumps, conditionals, etc.) can push variable amounts of data to the stack. Wherever there are two possibilities of data for the control flow inside a block, one can consider only the larger of the two. The maximum data depth for a call frame can be tracked rather than the data depth at each instruction. Such an approach can avoid considering non-call control flow paths and storing information on a per-instruction level.

As described herein, the canonical control flow graph can be annotated to indicate the number of bytes on the stack when a call takes place. Other representations (e.g., a stack frame size) that incorporate the number of bytes can be used.

EXAMPLE 8

Exemplary Program

In any of the examples herein, a program can take the form of a set of software instructions meant to be executed on a computing system. Such a program can be subjected to the static analysis described herein to build a control flow graph. Source code of the program need not be available because control flow can be determined via analysis of an executable.

As described herein, the program comprises one or more calls to other functions (e.g., that may pass parameters to the called function) that eventually execute a return instruction, which resumes execution back to the instruction immediately after the call site. Although the term "function" is used, such calls can be invoked to functions, procedures, or the like.

EXAMPLE 9

Exemplary Control Flow

A program can be a set of instructions that is eventually loaded in the computing system's memory; the instructions can be found at respective fixed addresses. Control flow can define how the processor picks the next instruction to execute.

Most instructions fall through; the next instruction to execute is found directly after the memory instruction of the current instruction.

A direct jump instruction has a parameter explicitly specifying the next instruction address.

A conditional jump instruction has a parameter specifying an instruction address and a condition parameter. If the condition parameter matches the processor state (e.g., determined by previous instructions), the next instruction is set using the address pointer; otherwise, the instruction falls through.

An indirect jump instruction specifies a general-purpose register that contains the address of the next instruction. This allows the next instruction address to be the result of an arbitrary calculation.

A call instruction calculates the next instruction address in memory (e.g., the address that would be used in the fall through case) and pushes it onto the stack. It then performs a direct jump to an address specified as a parameter.

An indirect call instruction is just like a call combined with an indirect jump instead of a direct jump. This allows the call address parameter to be the result of an arbitrary calculation.

A return instruction sets the next instruction address to the value popped off the top of the stack.

In ordinary programs, calls are expected to return. Calls are used to perform a jump to another part of the program, but the program is expected to eventually continue from the address after the call. The address pushed on to the stack is called the "return address," and it is expected to be popped from the stack with a return instruction.

Because a return instruction can only operate off the top of the stack, the stack is expected to be in the same state before and after the call. When a call instruction pushes an address to the stack and directs control to a new instruction address, it is said to have created a new stack frame. The instructions between the new instruction address and the eventual return should only use the stack above their frame to store data and create new calls.

Given the assumptions about ordinary programs, any behavior that modifies the value of the stack below the current frame can be classified as bad behavior (e.g., an attack). A class of attacks will attempt to overwrite return addresses below the current stack frame so that a return instruction will cause a jump to a different (e.g., non-ordinary) instruction. Other attacks will attempt to use the calculated targets for indirect calls or indirect jumps to the same effect. Such methods may give the attacker partial or complete control of the computing system.

The canonical control flow graph for a well-behaved (ordinarily executing) program can be constructed. The graph can then be used to inspect a running program's stack and detect attacks that call, jump, or return to non-canonical addresses (e.g., violate control flow integrity).

EXAMPLE 10

Exemplary Non-invasive Nature of Technologies

In any of the examples herein, a canonical control flow graph can be built for a program, and execution can be monitored without having to change the program. Thus, instrumentation or other modifications can be avoided. In this way, the timing of program instructions, which can be critical in real-time scenarios, can be preserved without interference by instrumentation. Thus, non-invasive control flow integrity checking can be performed.

EXAMPLE 11

Exemplary Action Taken

In any of the examples herein, action taken responsive to determining that the stack indicates an execution path not appearing in the control flow graph can include taking action avoiding further execution of the program, halting the program, quarantining the program, adding the program to a list, or the like.

EXAMPLE 12

Exemplary Control Flow Graph Builder Tool

Figure 4:
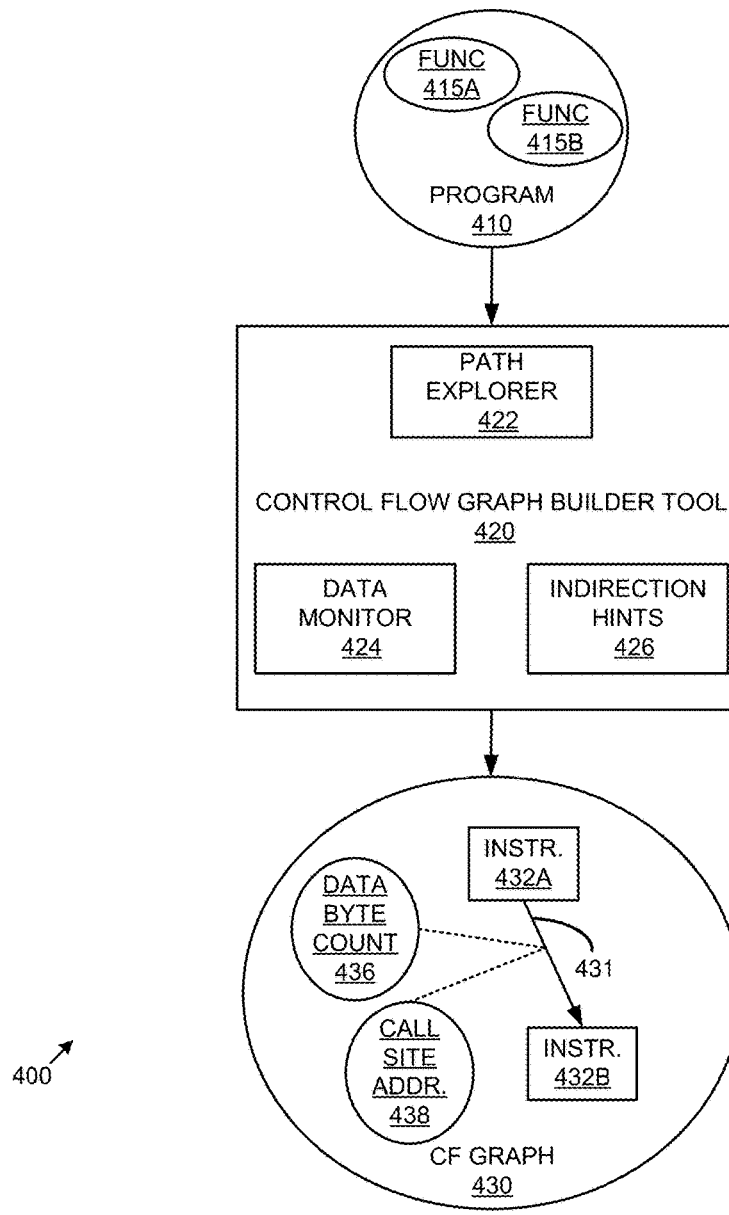
FIG. 4 is a block diagram of an exemplary system building a control flow graph for use with the control flow integrity technologies described herein.

FIG. 4 is a block diagram of an exemplary system building a control flow graph for use with the control flow integrity technologies described herein. In the example, the control flow graph builder tool 420 accepts an input program 410. As shown, the program comprises a plurality of functions 415A-B and calls between the functions.

The control flow graph builder tool 420 is an analysis tool that can perform a static control flow analysis on the program 410. A path explorer 422 can explore the possible ordinary execution paths of the program 410. Due to the number of possible execution paths, some aspects of static analysis (e.g., tracking values of variables) can be omitted, to avoid preserving too much information during the analysis. The control flow analysis can proceed without regard to evaluation of conditional statements. Instead, it can be presumed that whatever alternatives exist in the code are possible (e.g., if a condition never evaluates to "TRUE" in practice, the execution path for "TRUE" can still be included in the control flow graph).

Although some aspects of data can be ignored during the analysis, the number of resulting bytes (e.g., ordinary data) on the stack can still be recorded by a data monitor 424. The data monitor can determine the number of bytes by tracking pushes, pops, or other stack manipulations.

The tool 420 can acquire indirection hints 426 to provide guidance to limit the number of cases considered for some cases of indirect calls and indirect jumps. For example, a user can input thresholds to limit analysis, manually indicate addresses, or the like. Such indirection hints 426 can serve as overrides that allow human intervention to bound or determine values that are challenging to the static analysis. Such overrides can result in a faster completion of the static analysis.

As a result of the analysis, the tool 420 outputs the canonical call flow graph 430, which includes instruction ranges 432A-B represented as nodes. Nodes can further be annotated with an indication of the range (e.g., start and end addresses of the range) and the maximum number of non-return-address bytes pushed onto the stack while in the range.

Edges 431 can represent a connection between a call site (e.g., return address pushed to the stack during the call instructions) to the range containing the call target (e.g., typically, but not necessarily, the first address in a range). An edge 431 can be annotated with the call site address 438 and the number of data bytes 436 pushed to the stack at the time of the call.

EXAMPLE 13

Exemplary Method of Building Control Flow Graph

Figure 5:
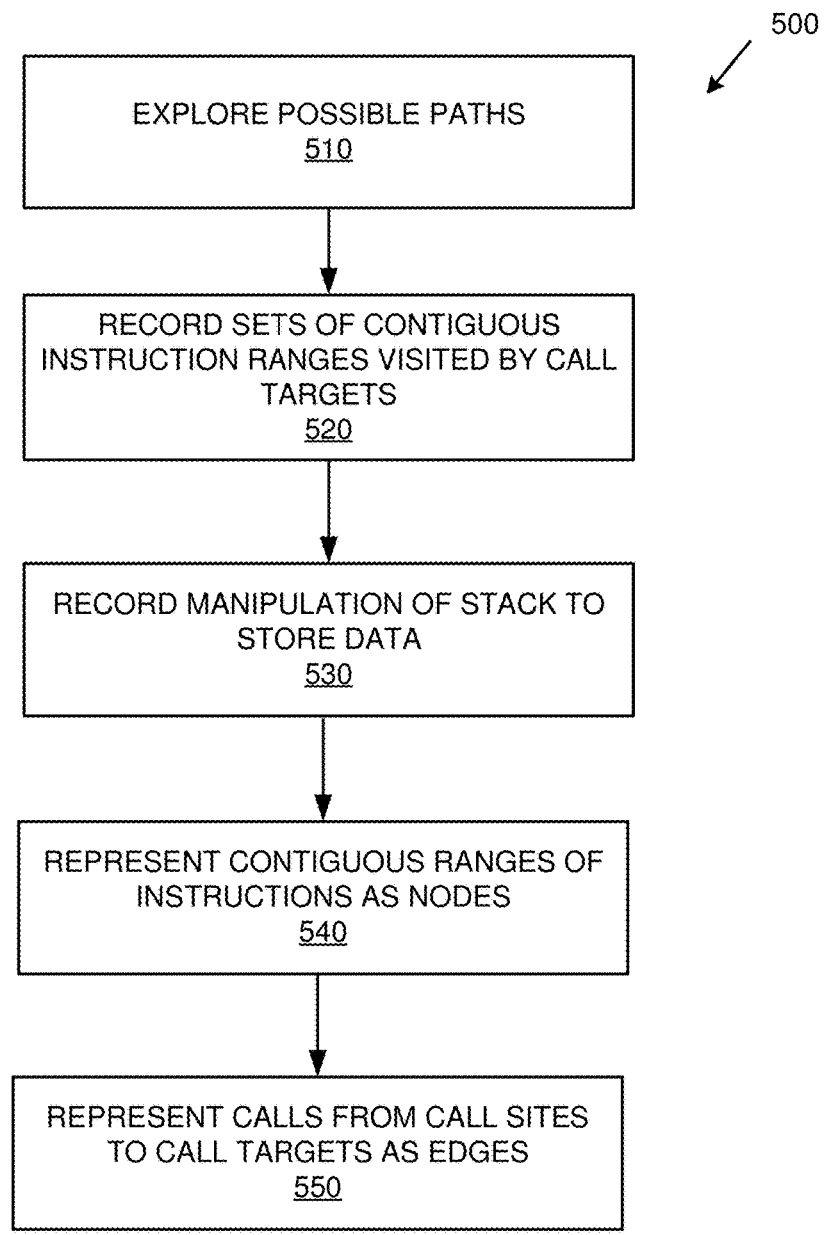
FIG. 5 is a flowchart of an exemplary method of building a control flow graph for use with the control flow integrity technologies described herein.

FIG. 5 is a flowchart of an exemplary method 500 of building a control flow graph and can be implemented, for example, in a system such as that shown in FIG. 4.

Some initial steps can be performed to prepare the program for analysis. For example, some disassembly can be performed on an executable to recognize instructions and parameters.

At 510, ordinarily possible paths of the program being analyzed are explored as described herein. A static analysis can be performed on the program. The analysis need not attempt to track program data, instead focusing on the control flow result of the instructions. For control flow cases (e.g., as described above), the analysis tool can explore possible paths (e.g., all ordinarily possible paths) by evaluating possible results for condition jumps, indirect calls, and indirect jumps. For some cases of indirect calls and indirect jumps, the user can provide guidance to the analysis tool to limit the number of cases considered as described herein.

The analysis can determine the set of instructions visited by call targets (e.g., excluding those visited due to calls from inside the call). A call target can be represented as a set of contiguous ranges of instruction addresses. At 520, the sets of contiguous instruction ranges visited by call targets are recorded. In any of the examples herein, a set of ranges, as opposed to a single range can be used because call targets need not reside in a contiguous block of memory, and the target may jump to blocks of instructions shared between various other targets due to compiler optimization (e.g., to save space).

At 530, manipulation of the stack by the program to store data can be recorded as described herein (e.g., to determine a maximum number of bytes pushed onto the stack for later use when identifying stack frames). In addition to tracking the possible control flow paths, the tool can also keep track of a stack frame's manipulation of the stack (e.g., for storing ordinary data). How much data is pushed onto the stack in each frame can be tracked in order to find the next return address (e.g., identify a stack frame) during subsequent runtime monitoring.

At 540, contiguous ranges of instructions can be represented as nodes as described herein. The control flow analysis result can be a directed acyclic graph represented as a set of annotated nodes and a set of annotated edges. A node can represent a single contiguous range of instructions. A node can be annotated with the start and end address of the range and the maximum number of non-return-address bytes pushed onto the stack while in the range. Edges in the graph connect the range containing the call site (e.g., return address pushed to the stack during the call instruction) to the range containing the call target (e.g., typically, but not necessarily, the first address in a range). The edge can be annotated with the call side address and the number of data bytes pushed to the stack at the time of the call.

At 550, call from call sites to call targets are represented as edges as described herein.

EXAMPLE 14

Exemplary Source Code of Program

FIG. 6 is a source code listing 600 of an exemplary program. In practice, source code is not required for the technologies to function, but the source code is provided for clarification. In the example, the function B_Task is the entry point for the operating system's execution of the program.

In practice, the program is compiled and linked. In a real-time operating system scenario, the program can be linked with the operating system.

In the example, considerations of program execution are omitted, except for performing function calls. Function arguments and return values are left out, as well as non-function call statements and flow control structures. In addition, the sample program makes only direct calls (e.g., no function pointers are used).

In practice, a program can be more complicated and employ a richer set of control flow mechanisms while still being supported by the technologies described herein.

EXAMPLE 15

Exemplary Disassembly of Program

FIG. 7 is a pseudo-disassembly 700 from a linked binary program originating from that shown in FIG. 6. For clarity, the disassembly 700 omits non-call instructions and any other functions in the binary not reachable from the B_Task entry point. The pseudo-disassembly 700 includes a list of pairs of labels and instructions. Instructions reside at respective concrete and known addresses in machine memory, but the disassembly is presented with labels for readability.

EXAMPLE 16

Exemplary Canonical Control Flow Graph

Figure 8:
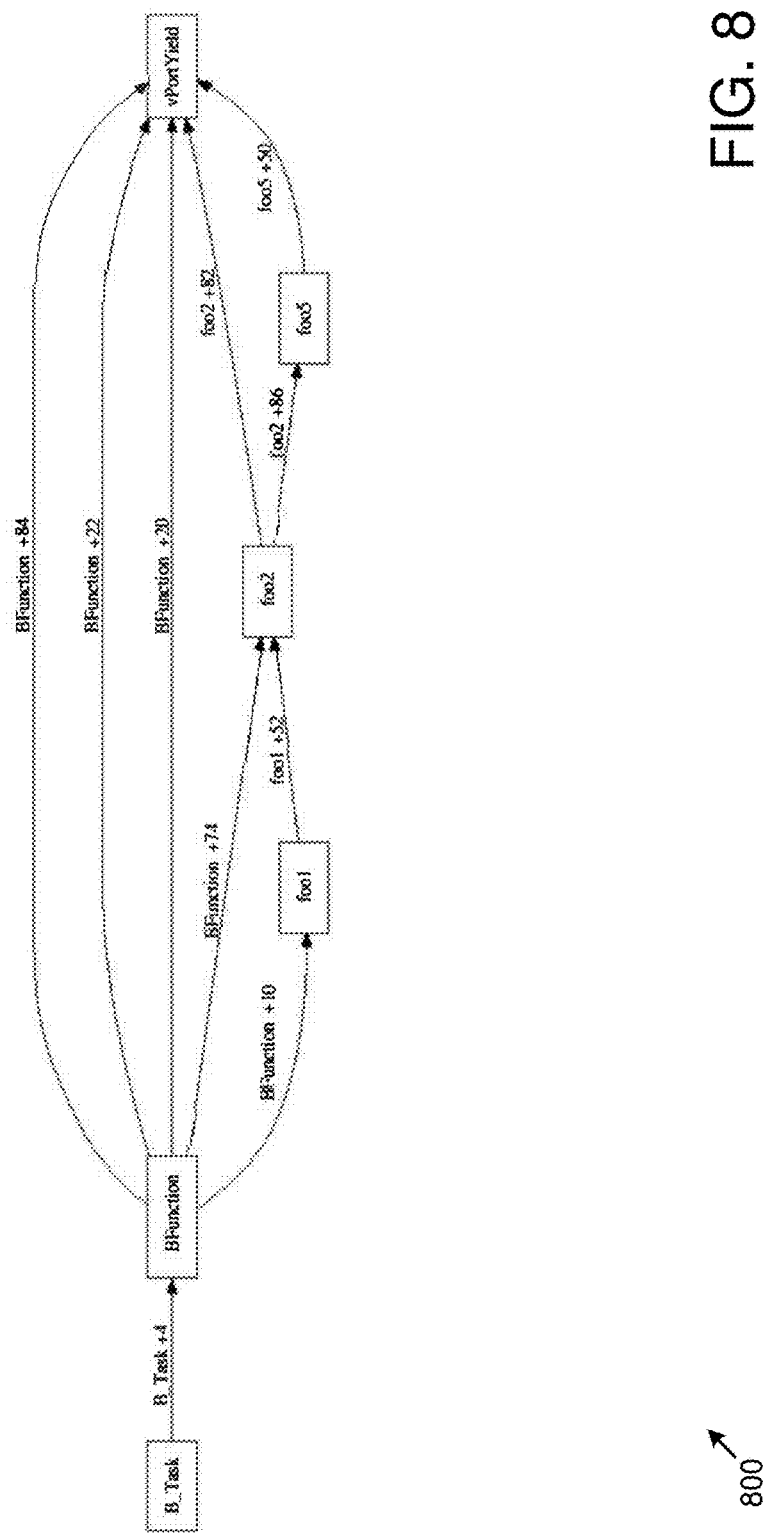
FIG. 8 is an exemplary canonical control flow graph of the exemplary program shown in FIG. 7.

FIG. 8 is an exemplary canonical control flow graph 800 inferred from analysis of the compiled program shown in FIG. 7.

Nodes in the graph 800 are labeled with the human-readable label corresponding to the range of instructions, derived from the debugging symbol table output by the linker.

Such human-readable information is not required for implementation of the technologies, but is helpful for debugging and clarification.

Edges are labeled with the return address of the call. The stack frame size at the call has been left off the figure for clarity.

EXAMPLE 17

Exemplary Control Flow Graph Representation

Figure 9:
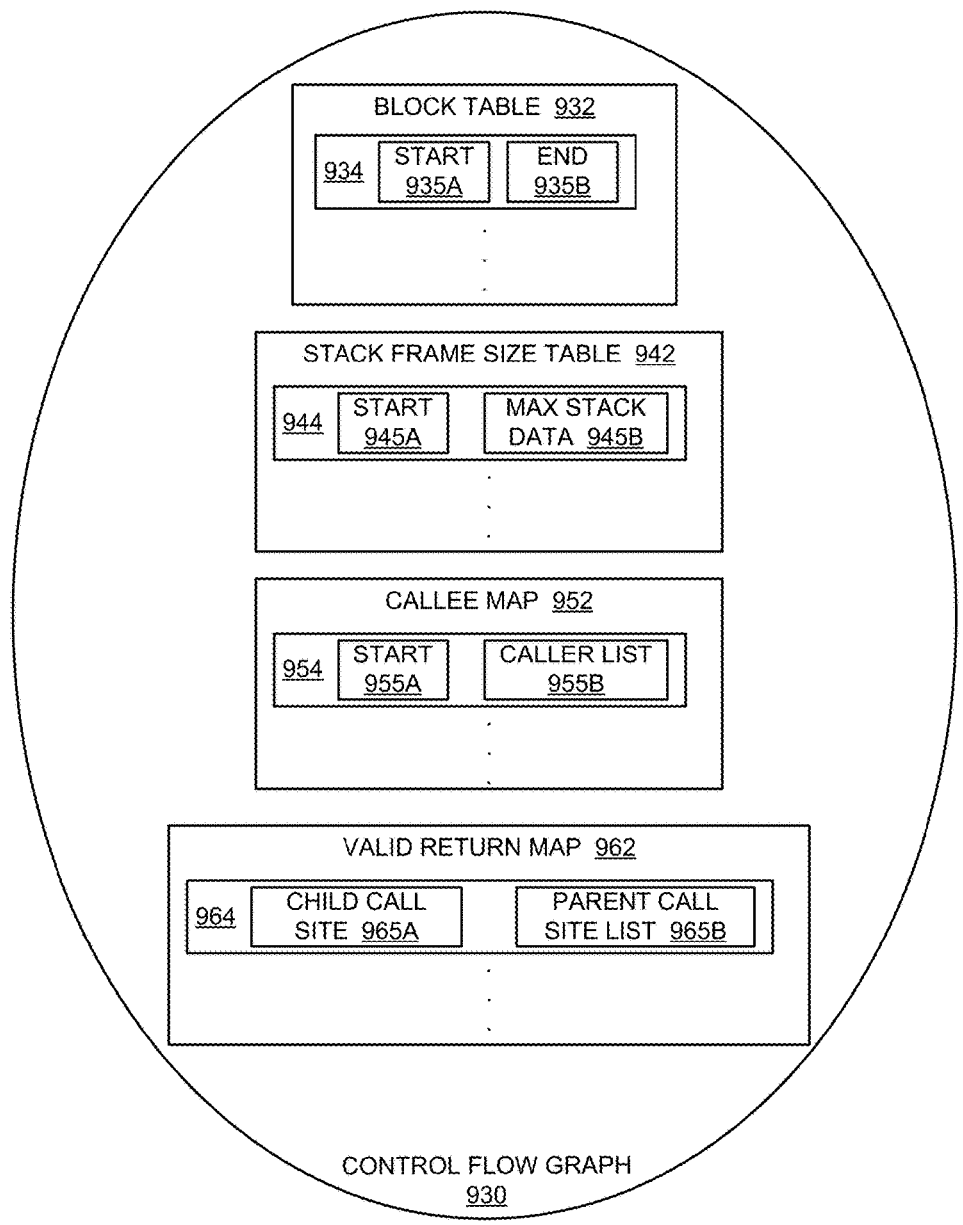
FIG. 9 is a block diagram of an exemplary control flow graph representation.

FIG. 9 is a block diagram of an exemplary canonical control flow graph representation. A control flow graph builder tool can reify the control flow graph by generating a plurality of tables. The tables can be used at runtime to validate a call stack (e.g., compare the contents of the stack with the canonical control flow graph). Some of the tables can duplicate information that can be found in others, in order to support fast binary search look-ups on different keys. For the sake of convenience, instruction address ranges are sometimes called "blocks," which are represented as nodes in the control flow graph.

A block table 932 can store a plurality of block bound (e.g., instruction address range) list entries 934 that include a start address 935A and an end address 935B. Thus, the instruction address ranges of blocks for the control flow graph can be represented.

A stack frame size table 942 can store a plurality of map entries 944 that map from an instruction range identifier (e.g., a block start address) 945A to maximum stack data 945A used by the block (e.g., maximum number of data bytes pushed to the stack by the instruction range).

A callee map 952 can store a plurality of map entries 954 that map from a block start address 955A to a list 955B of callers.

A valid return map 962 can include a plurality of map entries 964 that map from a child call site 965A to a list 965B of parent call sites.

Additional data can be stored, and other arrangements can be implemented according to design considerations. Instead of using a block start address, some other way of identifying the blocks can be used (e.g., a block ID, or the like).

EXAMPLE 18

Exemplary Method of Representing Control Flow Graph

Figure 10:
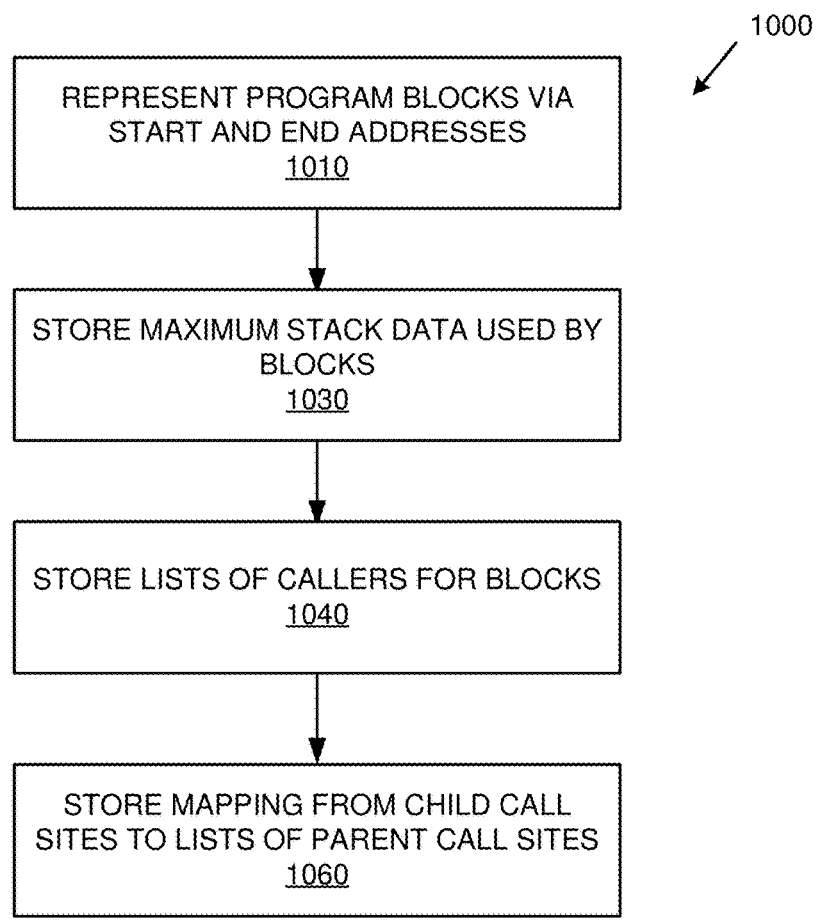
FIG. 10 is a flowchart of an exemplary method of representing a control flow graph for use with the technologies described herein.

FIG. 10 is a flowchart of an exemplary method 1000 of representing a control flow graph for use with the technologies described herein.

At 1010, program blocks are represented via start and end addresses. Such data can be stored as a table as shown in FIG. 9.

At 1030, maximum stack data used by the blocks is stored (e.g., using the block start address to identify the block). Such data can be stored as a table as shown in FIG. 9.

At 1040, lists of callers for blocks are stored (e.g., using the block start address of the callees). Such data can be stored as a table as shown in FIG. 9.

At 1060, mapping from child call sites to lists of parent call sites are stored. Such data can be stored as a table as shown in FIG. 9.

EXAMPLE 19

Exemplary System Comparing Stack with Control Flow Graph

Figure 11:
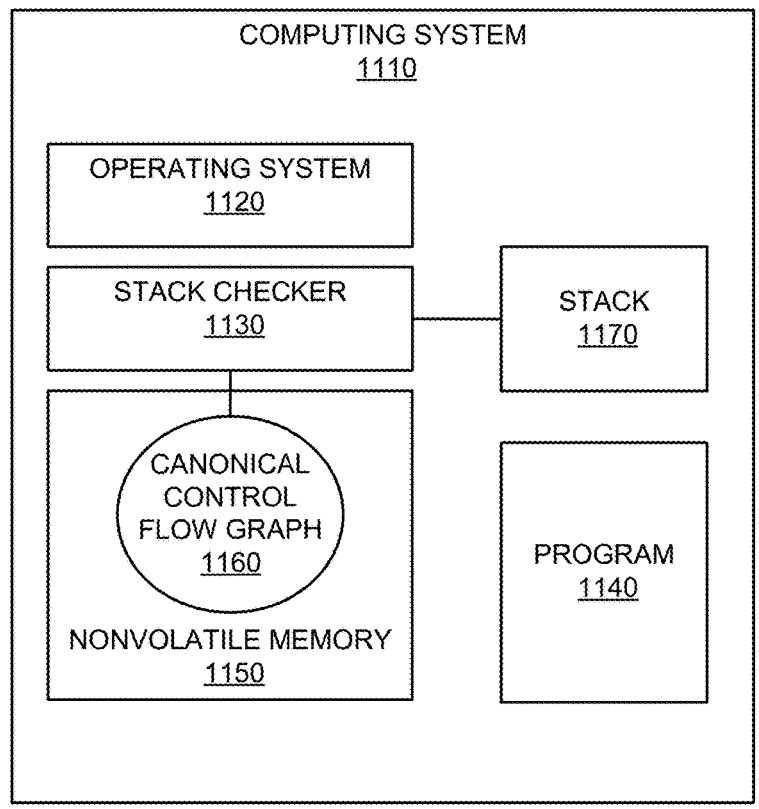
FIG. 11 is a block diagram of an exemplary system implementing the control flow graph technologies described herein via comparing a stack with a canonical control flow graph.

FIG. 11 is a block diagram of an exemplary system 1100 implementing the control flow graph technologies described herein via comparing a stack 1170 with a canonical control flow graph 1160.

In the example, an operating system 1120 orchestrates execution of a program 1140 and control flow integrity checking. A runtime stack checker 1130 has access to a canonical control flow graph 1160 stored in nonvolatile memory 1150 and checks control flow integrity by monitoring the stack 1170 at runtime (e.g., when invoked by the operating system 1120). Although the stack checker 1130 is shown outside the operating system 1120, the operating system 1120 can encompass the stack checker 1130.

As a result of checking the control flow integrity, the stack checker 1130 can output an indication (e.g., to the operating system) that the integrity check has failed. Action can then be taken to avoid further execution of the program 1140 (e.g., because it has violated its canonical control flow, which indicates that the system 1110 has been attacked).

EXAMPLE 20

Exemplary Method Comparing Stack with Control Flow Graph

Figure 12:
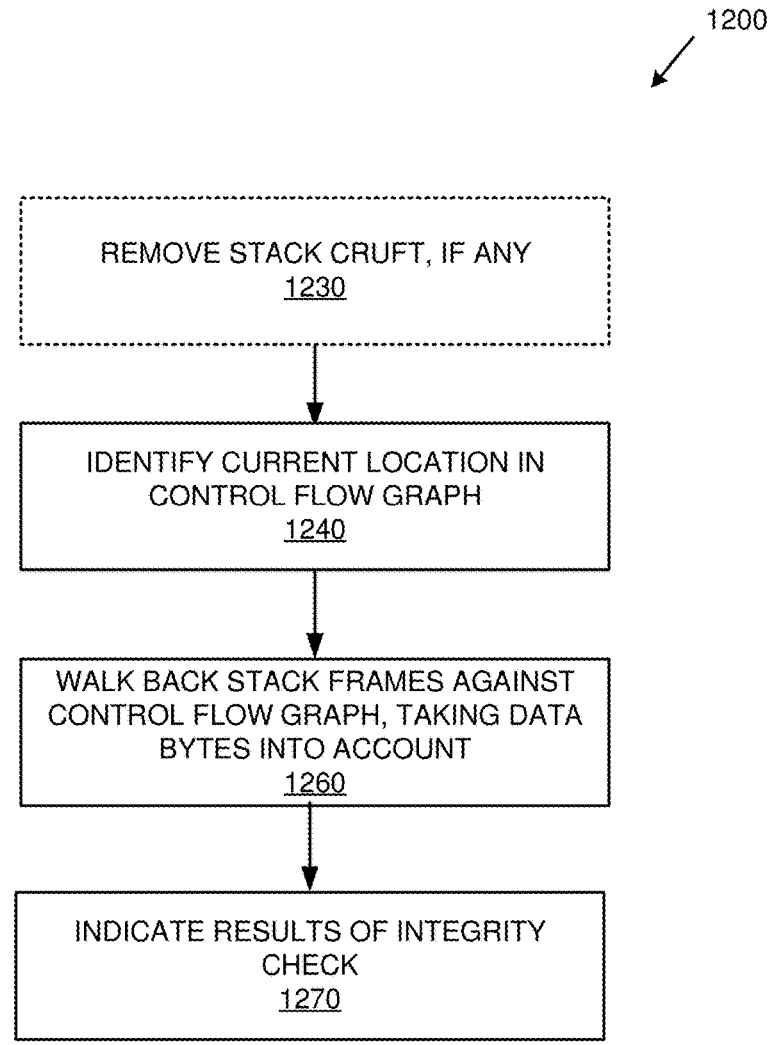
FIG. 12 is a flowchart of an exemplary method of comparing a stack with a canonical control flow graph.

FIG. 12 is a flowchart of an exemplary method 1200 of comparing a stack with a canonical control flow graph (e.g., as shown in FIG. 3) and can be implemented, for example, in a system such as that shown in FIG. 11.

The method 1200 can be performed after interruption of the program being observed. Access to the stack (e.g., via the stack pointer) or a copy of it can be provided.

At 1230, stack cruft, if any can be removed (e.g., ignored during the comparison). For example, as an artifact of having interrupting the program, there may be various types of return information (e.g., tick vector, cooperative yield call, etc.) at the top of the stack, which can be removed before comparing the stack to the control flow graph. Heuristics can be used to determine whether stack cruft is present.

At 1240, the current location in the control flow graph can be identified. For example, it can be determined where within the program (e.g., what address) the program was executing when it was interrupted.

At 1260, stack frames can be walked back (e.g., to previous callers) against the control flow graph (e.g., to possible previous callers). During the process, earlier stack frames (e.g., for a prior call) can be found (e.g., traversing the stack back to prior stack frames), taking the data bytes into account (e.g., to identify stack frames). For example, finding a stack frame (e.g., where the stack frame starts on the call stack) can account for the maximum number of data bytes pushed onto the stack as indicated by the graph (e.g., on an annotated edge representing the call). The analysis can continue until the entry point is reached.

Although the stack frames are the result of earlier-in-time calls, they are sometimes called the "next" stack frame because the stack frame analysis navigates backward in time (e.g., starts with the current call at the top of the stack and proceeds next to find stack frames for earlier calls).

EXAMPLE 21

Exemplary Blacklisting

In any of the examples herein, functions in the control flow graph can be designated as invalid after a designated part of the program is executed. For example, startup code in a program can be marked as invalid after initialization completes.

Such an arrangement can be accomplished by adding nodes or blocks to a list, marking the node as invalid, or the like. Subsequently, if such functions appear on the call stack, control flow integrity can be considered to have failed (e.g., comparing the contents of the stack with the canonical control flow graph ignores the invalid portion of the canonical control flow graph as an ordinary execution path). Matches against the invalid portion of the control flow graph are disallowed.

EXAMPLE 22

Exemplary Timing Integrity

In any of the examples herein, control-flow-dependent timing integrity checks can be performed. Real-time embedded systems can have timing constraints dependent on control-flow.

A maximum amount of allotted time can be stored as a timing constraint. For example, a networking driver may be required to return within 10 milliseconds, but maliciously-formed packets can cause it hang, causing a system-wide denial-of-service.

The control flow graph can be annotated with timing constraints. Timing constraints can be associated with portions of the code (e.g., one or more nodes in the control flow graph), and the actual time spent executing such portions can be analyzed (e.g., elapsed execution time for a portion associated with a node can be observed). During execution, a violation of such timing constraints can be identified. Responsive to identifying a violation of a timing constraint (e.g., the time elapsed exceeds the timing constraint), action can be taken as described in Example 11.

EXAMPLE 23

Exemplary Interruptibility of Integrity Checking

In any of the examples herein, it may be desirable to interrupt integrity checking (e.g., the method of FIG. 3, FIG. 12, etc.). For example, in the case of a real-time operating system, a limited amount of time may be available for performing integrity checking.

Accordingly, integrity checking can be interrupted upon expiration of a timer or the like. Integrity checking can be restarted at a later time. Upon resumption of the method, data from previous iterations (e.g., contents of the stack of a previous iteration) can be discarded (e.g., in favor of current contents of the stack).

In practice, quick checks for the top of the stack can be performed periodically, and full stack checks can be performed when task scheduling permits.

EXAMPLE 24

Exemplary Control Flow Graph and Stack Walkthrough

Figure 13:
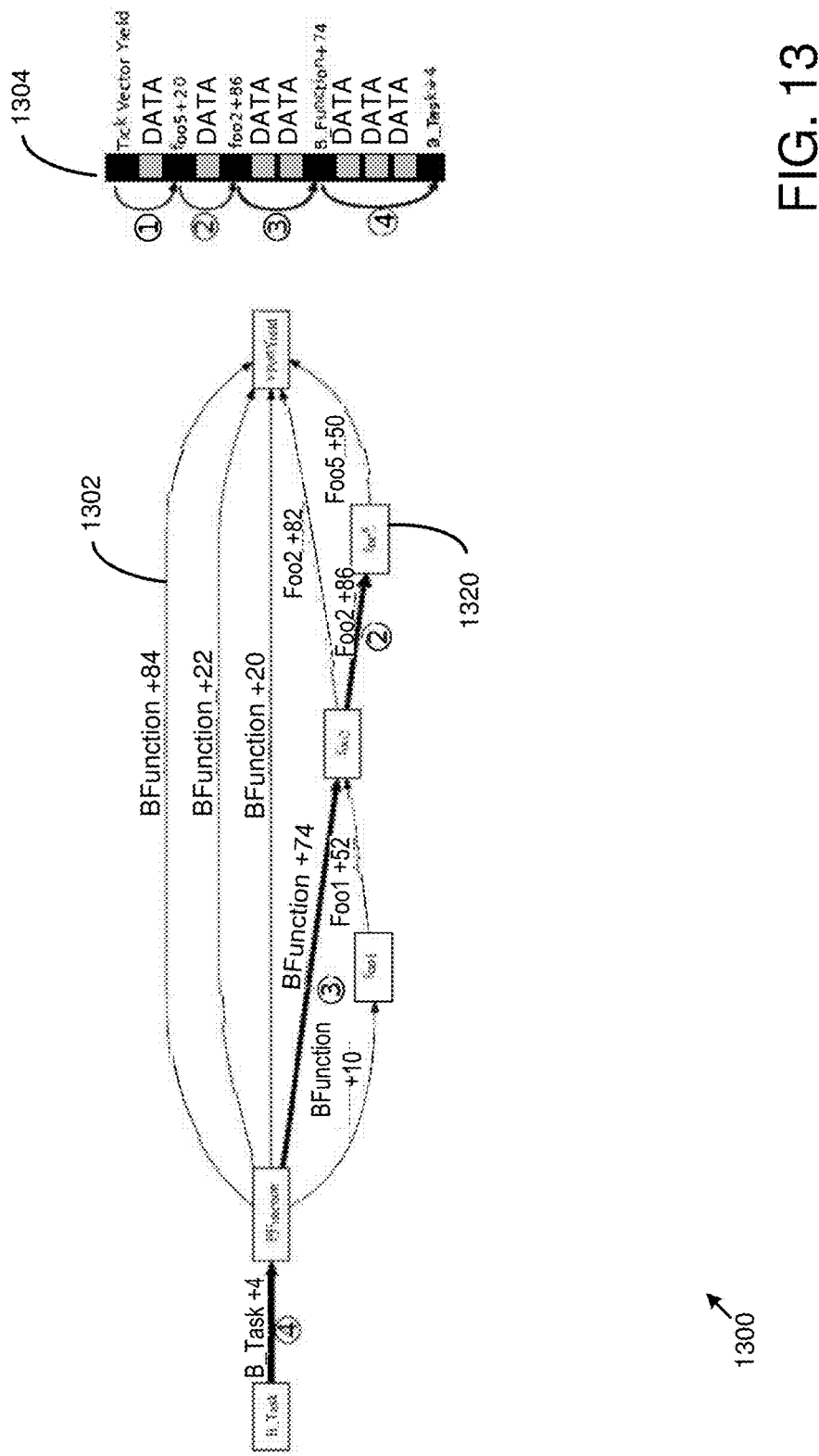
FIG. 13 is a block diagram of an exemplary control flow graph representation and a stack being checked against the graph.

FIG. 13 is a block diagram of an exemplary control flow graph 1302 representation and a stack 1304 being checked against the graph. FIGS. 14, 15, and 16 are pseudo code listings for a stack checking technique showing Routines A, B, and C, respectively.

FIG. 13 includes an annotated version of the control flow graph from FIG. 8 as well as a sample program stack. The node at the top of the stack 1304 designates a tick vector yield, which is at the top of the stack at the beginning of the control flow integrity analysis.

In (1), the analysis entry point is described in Routine A (Stack Checking). In such a case, the analysis uses a technique to determine the top node is inside the tick vector. The distance to the preemption address is 1 byte, shown by the data byte on the stack. At the conclusion of (1), the preemption address (foo5+20) is known.

The analysis can find where the program was interrupted by decoding the state of the hardware and the operating system. Such a technique can vary by platform and operating system implementation.

At the beginning of (2), the instruction at which a block was interrupted by the operating system tick is known. Routine A calls Routine B. First, the block 1320 (foo5) containing the instruction address foo5+20 is found. Then, the maximum number of bytes pushed to the stack by foo5 is found; in the example, the value must be greater than one.

The list of possible callers for foo5 is also looked up; in the example, foo5 has only one caller (foos+86). At the end of (2), the search has discovered the foo2+86 address, the next address on the stack 1304. There has been one data byte pushed on the stack while in the foo5 block. (2) means the successful completion of the call to Routine B from Routine A.

At the beginning of (3), Routine A has successfully found a frame, and enters a loop of calls to Routine C (Check Stack From Frame). Routine C begins with a current frame return address of foo2+86. A search of the valid return map for foo2+86 will indicate it has two possible parent return addresses: BFunction+74, at a stack depth of 2 bytes, and foo1+52, at some other stack depth. Routine C will search these possibilities and discover the return address BFunction+74 on the stack at a depth of two bytes. It returns the VFunction+74 stack frame to the loop of Routine A.

(4) repeats the same process as (3), but is essentially trivial, as the search through BFunction's callers only has one possibility, B_Task+4 at a depth of 3 data bytes.

The loop of Routine A terminates at the end of (4) because the task entry point has been found. So, in the example, control flow integrity has been successfully verified; however, the pseudo code has logic for handling failure as well.

EXAMPLE 25

Exemplary Stack Cruft Detection and Removal

In any of the examples herein, techniques shown in Routine A can be used to detect stack cruft. Approaches shown include detecting whether the top of stack is inside a tick vector, detecting whether the top of stack is inside a cooperative yield call, and detecting whether a non-kernel interrupt service routine caused a cooperative yield. Removal can proceed according to the type of cruft. The values of the data bytes in the cruft need not be tracked or validated. They can simply be skipped to find the next return address.

EXAMPLE 26

Exemplary Advantages

Implementing the technologies herein may result in any one or more of the following advantages, which are not meant to be an exhaustive list:

Programs for which source code is not available can be analyzed and monitored by the technologies described herein.

Programs need not be modified or instrumented to be monitored. Non-invasive monitoring can be performed.

Attacks against unknown vulnerabilities can be detected.

Attacks using stack tampering can be avoided, regardless of how the stack tampering is achieved.

EXAMPLE 27

Exemplary Computing Environment

The techniques and solutions described herein can be performed by software, hardware, or both of a computing environment, such as one or more computing devices or computing systems. For example, computing devices include server computers, desktop computers, laptop computers, notebook computers, handheld devices, netbooks, tablet devices, mobile devices, PDAs, and other types of computing devices.

Figure 17:
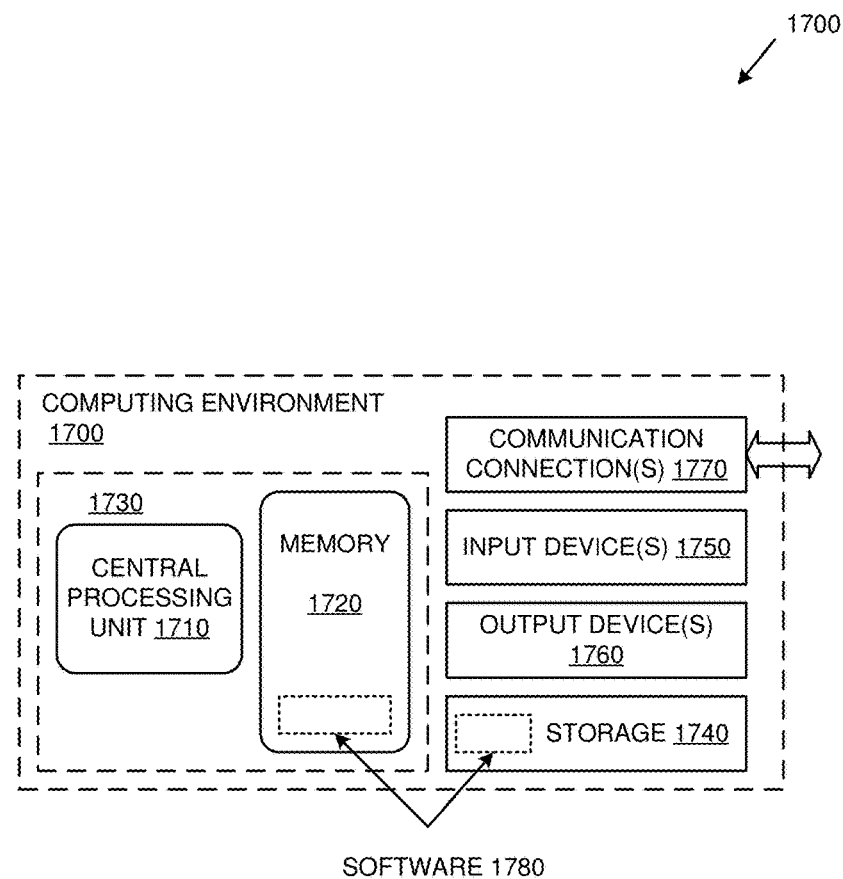
FIG. 17 is a block diagram of an exemplary computing environment suitable for implementing any of the technologies described herein.

FIG. 17 illustrates a generalized example of a suitable computing environment 1700 in which the described technologies can be implemented. The computing environment 1700 is not intended to suggest any limitation as to scope of use or functionality, as the technologies may be implemented in diverse general-purpose or special-purpose computing environments. For example, the disclosed technology may be implemented using a computing device comprising a processing unit, memory, and storage storing computer-executable instructions implementing the technologies described herein. The disclosed technology may also be implemented with other computer system configurations, including hand held devices, multiprocessor systems, microprocessor-based or programmable consumer electronics, network PCs, embedded systems, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices With reference to FIG. 17, the computing environment 1700 includes at least one processing unit 1710 coupled to memory 1720. In FIG. 17, this basic configuration 1730 is included within a dashed line. The processing unit 1710 executes computer-executable instructions and may be a real or a virtual processor. In a multi-processing system, multiple processing units execute computer-executable instructions to increase processing power. The memory 1720 may be volatile memory (e.g., registers, cache, RAM), non-volatile memory (e.g., ROM, EEPROM, flash memory, etc.), or some combination of the two. The memory 1720 can store software 1780 implementing any of the technologies described herein.

A computing environment may have additional features. For example, the computing environment 1700 includes storage 1740, one or more input devices 1750, one or more output devices 1760, and one or more communication connections 1770. An interconnection mechanism (not shown) such as a bus, controller, or network interconnects the components of the computing environment 1700. Typically, operating system software (not shown) provides an operating environment for other software executing in the computing environment 1700, and coordinates activities of the components of the computing environment 1700.

The storage 1740 may be removable or non-removable, and includes magnetic disks, magnetic tapes or cassettes, CD-ROMs, CD-RWs, DVDs, or any other computer-readable media which can be used to store information and which can be accessed within the computing environment 1700. The storage 1740 can store software 1780 containing instructions for any of the technologies described herein.

The input device(s) 1750 may be a touch input device such as a keyboard, mouse, pen, or trackball, a voice input device, a scanning device, or another device that provides input to the computing environment 1700. For audio, the input device(s) 1750 may be a sound card or similar device that accepts audio input in analog or digital form, or a CD-ROM reader that provides audio samples to the computing environment. The output device(s) 1760 may be a display, printer, speaker, CD-writer, or another device that provides output from the computing environment 1700.

The communication connection(s) 1770 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Any of the computer-readable media herein can be non-transitory (e.g., memory, magnetic storage, optical storage, or the like).

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, or the like). Such instructions can cause a computer to perform the method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims.

We therefore claim as our invention all that comes within the scope and spirit of the claims.

We claim:

1. One or more computer-readable devices comprising:
a control flow graph builder tool configured to construct a data structure during static analysis of a program, the data structure representing a canonical control flow graph for validation of a call stack at runtime, the validation of the call stack at runtime comprising a comparison of contents of the call stack with the canonical control flow graph, the comparison accepting the canonical control flow graph along with one or more runtime stack observations as input and outputting a check result indicating whether the call stack conforms to the canonical control flow graph, wherein the data structure comprises:
a block table storing a table of block start addresses and respective block end addresses for a plurality of blocks indicative of instruction ranges in the canonical control flow graph;
a stack frame size table mapping block start addresses to respective maximum stack data used by the blocks identified by the block start addresses before a call;
a callee map table mapping block start addresses to respective lists of callers; and
a valid return map mapping child call sites to respective parent call sites.

2. The one or more computer-readable devices of claim 1 wherein:
the block table represents address ranges of blocks for the canonical control flow graph.

3. The one or more computer-readable devices of claim 1 wherein:
the maximum stack data used by the blocks indicates a maximum number of non-return-address bytes pushed to the call stack by an instruction range indicated by a particular block start address.

4. One or more non-transitory computer-readable storage media comprising:
a data structure representing a canonical control flow graph for validating a stack at runtime of a program, the canonical control flow graph constructed during static analysis of the program, and the validation of the stack at runtime comprising a comparison of contents of the stack with the canonical control flow graph; and
instructions that, when executed, cause a computer to accept the canonical control flow graph along with one or more runtime stack observations as input, and output a check result indicating whether the stack conforms to the canonical control flow graph, wherein the data structure comprises:
a block table storing a table of block address ranges for a plurality of blocks indicative of instruction ranges in the canonical control flow graph, wherein the block address ranges comprise respective block identifiers;
a stack frame size table mapping block identifiers to respective maximum stack data used by the plurality of blocks identified by the block identifiers before a call, wherein the maximum stack data used by the plurality of blocks indicates a maximum number of bytes pushed to the stack by an instruction range indicated by a particular block identifier;

a callee map table mapping block identifiers to respective lists of callers; and a valid return map mapping child call sites to respective parent call sites.

5. The one or more non-transitory computer-readable storage media of claim 4 wherein:

the maximum stack data used by the plurality of blocks indicates a maximum number of non-return-address bytes pushed to the stack by an instruction range indicated by a particular block identifier.

6. A method implemented at least in part by a computing device, the method comprising:

storing a canonical control flow graph indicating possible ordinary execution paths for a program, wherein the canonical control flow graph comprises (a)-(d):

(a) a block table storing a table of block start addresses and respective block end addresses for a plurality of blocks indicative of instruction ranges in the canonical control flow graph;

(b) a stack frame size table mapping block start addresses to respective maximum stack data used by the plurality of blocks identified by the block start addresses before a call;

(c) a callee map table mapping block start addresses to respective lists of callers; and (d) a valid return map mapping child call sites to respective parent call sites;

observing a stack during execution of the program, wherein the observing comprises determining contents of the stack;

comparing the contents of the stack with the canonical control flow graph, wherein the comparing comprises determining whether the contents of the stack indicate an execution path not appearing in the possible ordinary execution paths; and responsive to determining that the contents of the stack indicate the execution path not appearing in the possible ordinary execution paths, taking action avoiding further execution of the program.

7. The method of claim 6 wherein:

taking action comprises halting execution of the program.

8. The method of claim 6 further comprising:

periodically interrupting the program during execution, wherein the observing is performed via the interrupting.

9. The method of claim 8 wherein the interrupting is performed by an operating system.

10. The method of claim 9 wherein the program is not instrumented to achieve the interrupting.

11. The method of claim 6 wherein:

the method is interruptible; and upon resumption of the method, contents of the stack of a previous iteration are discarded in favor of current contents of the stack.

12. The method of claim 6 further comprising:

responsive to determining that a top of the stack contains cruft, removing the cruft before comparing the contents of the stack with the canonical control flow graph.

13. The method of claim 6 wherein:

the canonical control flow graph is annotated to indicate a number of data bytes pushed onto the stack by instructions within an indicated address range.

14. The method of claim 13 wherein:

the comparing comprises finding a stack frame for a prior call; and finding a stack frame comprises accounting for the number of data bytes pushed onto the stack as indicated by the canonical control flow graph.

15. The method of claim 6 wherein:

storing the canonical control flow graph comprises storing a table of start addresses and respective end addresses for a plurality of instruction ranges.

16. The method of claim 6 wherein:

storing the canonical control flow graph comprises storing a table mapping instruction range identifiers to respective maximum stack data used by an instruction range.

17. The one or more computer-readable devices of claim 1, wherein the control flow graph builder tool comprises:

a path explorer;

a data monitor; and indirection hints.

18. The one or more computer-readable devices of claim 17, wherein:

the path explorer is configured to explore possible ordinary execution paths of the program;

the data monitor is configured to determine a number of bytes on a stack by tracking stack manipulations; and the indirection hints serve as overrides that allow human intervention to determine values that are challenging to the static analysis.

* * * * *